(12) United States Patent
Yamanaka et al.

(10) Patent No.: US 6,479,745 B2
(45) Date of Patent: Nov. 12, 2002

(54) DYE-SENSITIZED SOLAR CELL AND METHOD OF MANUFACTURING THE SAME

(75) Inventors: Ryosuke Yamanaka, Gojo (JP); Liyuan Han, Kitakatsuragi-gun (JP); Kazuhiro Emoto, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/768,809

(22) Filed: Jan. 25, 2001

(65) Prior Publication Data

US 2001/0027806 A1 Oct. 11, 2001

(30) Foreign Application Priority Data

| Jan. 26, 2000 | (JP) | ................................ 2000-016672 |
| May 26, 2000 | (JP) | ................................ 2000-156733 |
| Sep. 5, 2000 | (JP) | ................................ 2000-268870 |

(51) Int. Cl.[7] .................. H01L 31/04; H01M 14/00
(52) U.S. Cl. ............... 136/263; 136/256; 136/265; 136/252; 429/111; 257/43; 257/40; 257/431; 438/85; 438/82; 438/57
(58) Field of Search ............. 136/263, 256, 136/265, 252; 429/111; 257/43, 40, 431; 438/85, 82, 57

(56) References Cited

U.S. PATENT DOCUMENTS

| 4,908,283 A | * | 3/1990 | Takahashi et al. | .......... 429/317 |
| 5,622,791 A | * | 4/1997 | Shackle | .......... 429/111 |
| 6,150,605 A | * | 11/2000 | Han | .......... 136/263 |
| 6,291,763 B1 | * | 9/2001 | Nakamura | .......... 136/256 |

FOREIGN PATENT DOCUMENTS

| EP | 720189 A2 | * | 7/1996 |
| JP | 7-249790 A | | 9/1995 |
| JP | 8-15097 B2 | | 2/1996 |
| JP | 8-236165 A | * | 9/1996 |
| JP | 9-27352 A | | 1/1997 |
| JP | 2664194 B2 | | 6/1997 |

OTHER PUBLICATIONS

Matsumoto et al, "A dye sensitized TiO2 photoelectrochemical cell constructed with polymer solid electrolyte," Solid State Ionics, 89 (1996) 263–267.*

* cited by examiner

Primary Examiner—Alan Diamond
(74) Attorney, Agent, or Firm—Nixon & Vanderhye

(57) ABSTRACT

A dye-sensitized solar cell comprising a porous semiconductor layer in which a dye is adsorbed and an electrolyte which are sandwiched between a transparent conductive film formed on a surface of a transparent substrate and a conductive substrate, wherein the electrolyte is retained in a crosslinked polymer compound.

21 Claims, 4 Drawing Sheets

— oxidation-reduction electrolyte solution
—●— general formula (IV)

— oxidation-reduction electrolyte solution
—●— general formula (IV) (25°C)
—■— general formula (IV) (50°C)

DYE-SENSITIZED SOLAR CELL AND METHOD OF MANUFACTURING THE SAME

CROSS-REFERENCE TO RELATED APPLICATIONS

This application is related to Japanese Patent Applications Nos. 2000-016672 filed on Jan. 26, 2000, 2000-156733 filed on May 26, 2000 and 2000-268870 filed on Sep. 5, 2000 whose priorities are claimed under 35 USC §119, the disclosure of which is incorporated by reference in its entirety.

BACKGROUND OF THE INVENTION

1. Field of the Invention

The present invention relates to a dye-sensitized solar cell utilizing a solid polyelectrolyte. More particularly, it relates to a dye-sensitized solar cell utilizing a crosslinked polymer compound obtained by polymerizing units having a specific structure.

2. Description of Related Art

When a photovoltaic material is irradiated with light, electrons restricted to an atom in the photovoltaic material are released by light energy to move freely, which generates free electrons and holes. The free electrons and the holes are efficiently separated so that electric energy is continuously extracted. That is, the photovoltaic material is capable of converting light energy to electric energy. Such photovoltaic material has been utilized as a solar cell and the like.

A dye-sensitized solar cell (hereinafter merely referred to as "solar cell") has widely drawn attention because of its higher photovoltaic efficiency than other organic solar cells. The solar cell is comprised of an electrolyte solution layer sandwiched between a semiconductor electrode and a counter electrode. When the semiconductor electrode is irradiated with light, electrons are excited therein and transferred to the counter electrode through an electric circuit. The transferred electrons are re-transferred as ions to the semiconductor electrode through the electrolyte. This cycle is repeated to extract electric energy.

In a surface of the semiconductor electrode used as a photovoltaic material in the solar cell, a photosensitivity enhancing dye having an absorption spectrum in the range of visible rays is adsorbed. With respect to such solar cell, Japanese Patent No. 2664194 describes a solar cell utilizing a metal oxide semiconductor which adsorbs in its surface a photosensitivity enhancing dye comprising a transition metal complex. Published Examined Patent Application No. Hei 8 (1996)-15097 describes a solar cell utilizing a titanium oxide semiconductor doped with metal ions on which a layer of a photosensitivity enhancing dye comprising a transition metal complex or the like is formed. Further, Published Unexamined Patent Publication-No. Hei 7 (1995)-249790 discloses a solar cell utilizing a semiconductor for photovoltaic conversion obtained by heating a solution of a photosensitivity enhancing agent in ethanol to reflux on a surface of the semiconductor.

FIG. 5 is a schematic sectional view of a major part illustrating a layered structure of a prior art solar cell utilizing an oxidation-reduction electrolyte solution. The solar cell is manufactured in the following steps. therein. A counter electrode 55 coated with a catalyst such as platinum 56 or the like is First, one a transparent conductor 52 formed on a surface of a transparent support 51, a semiconductor layer 53 of titanium oxide or the like is formed and a dye is absorbed coupled with the transparent support 51 so that the semiconductor layer 53 and the platinum 56 are faced to each other, and then an electrolyte solution 54 is injected therebetween. Thereafter, the circumference of the coupled structure is sealed with an epoxy resin 57, 58 or the like.

In order to avoid solution leakage of the electrolyte solution layer 58, Japanese Unexamined Patent Publications Nos. Hei 8 (1996)-236165 and Hei 9 (1997)-27352 describe a solar cell in which the electrolyte solution layer is solidified. A known method of solidifying the electrolyte solution layer is as follows. First, iodide (lithium iodide or the like) which functions as an oxidation-reduction seed is dissolved in a solution obtained by dissolving a monomer represented by the general formula (IV):

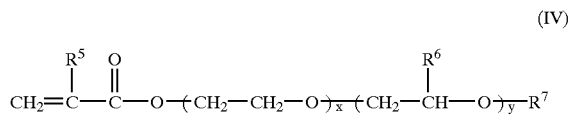

(IV)

wherein $R^5$ and $R^6$, equal to or different to each other, are a hydrogen atom or a methyl group, $R^7$ is a hydrogen atom or a lower alkyl group, x is an integer of 1 or more, y is an integer of 0 or more and y/x is 0 to 5 in ethylene glycol and the solution is impregnated into the porous semiconductor layer. Then, it is polymerized by ultraviolet rays or heat to obtain a polymer compound and iodine which functions as another oxidation-reduction seed is doped by sublimation. Thus, the solidified electrolyte layer is formed.

However, it is difficult to obtain a crosslinked polymer compound by the above-mentioned polymerization since the monomer of the general formula (IV) has only one vinyl group. The polymerization only with the monomer of the general formula (IV) generates a linear or a branched polymer compound which is not crosslinked, so that retention of the electrolyte and the electrolyte solution is reduced and mechanical strength becomes poor. Further, it is also difficult to control the amount of iodine doped in the polymer compound by the above-described sublimation, so that it is not preferable in view of reproducibility.

SUMMARY OF THE INVENTION

In view of the above drawbacks, the present invention has been achieved to provide, with use of the crosslinked polymer compound, a dye-sensitized solar cell including a polyelectrolyte having excellent retention of the solution and favorable mechanical strength. The invention also provides a method of manufacturing the dye-sensitized solar cell in which the polyelectrolyte is produced with good precision by impregnating a solution of two kinds of electrolytes which act as oxidation-reduction seeds in the crosslinked polymer compound.

The inventors of the present invention has eagerly studied to solve the above drawbacks and found that the crosslinked polymer compound obtained by polymerizing specific monomers exhibits great retention of solution and mechanical strength. Thus, the present invention has been completed.

According to the present invention, provided is a dye-sensitized solar cell comprising a porous semiconductor layer in which a dye is adsorbed and an electrolyte which are sandwiched between a transparent conductive film formed on a surface of a transparent substrate and a conductive substrate, wherein the electrolyte is retained in a crosslinked polymer compound.

Still according to the present invention, provided is a method of manufacturing a dye-sensitized solar cell comprising the steps of:

(a) forming a transparent conductive film on a surface of a transparent substrate;

(b) forming a porous semiconductor layer on a surface of the transparent conductive film;

(c) impregnating a dye solution in the porous semiconductor layer;

(d) impregnating a solution containing units capable of forming a crosslinked polymer compound through polymerization in the porous semiconductor layer to form a polymer compound on the surface and in the inside of the porous semiconductor layer;

(e) impregnating an electrolyte solution in the polymer compound to form an electrolyte; and (f) placing a conductive substrate and sealing a circumference portion thereof.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
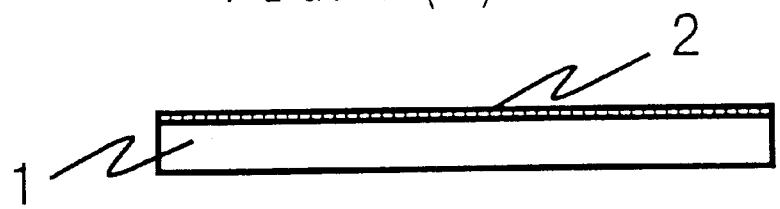
FIGS. 1(a) to 1(e) are schematic sectional views illustrating the steps of manufacturing a dye-sensitized solar cell utilizing a polyelectrolyte according to the present invention.
Figure 1:
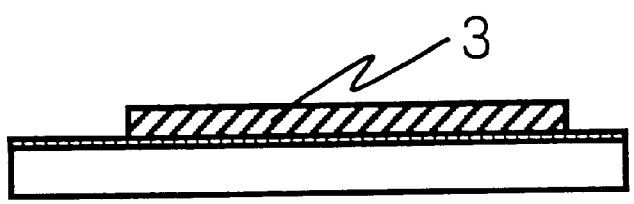
Figure 1:
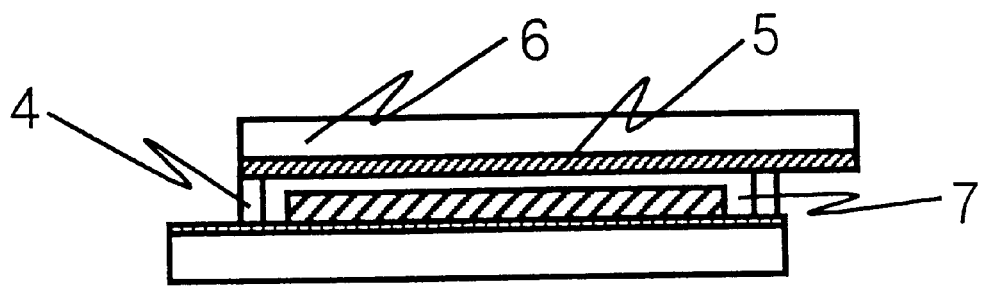
Figure 1:
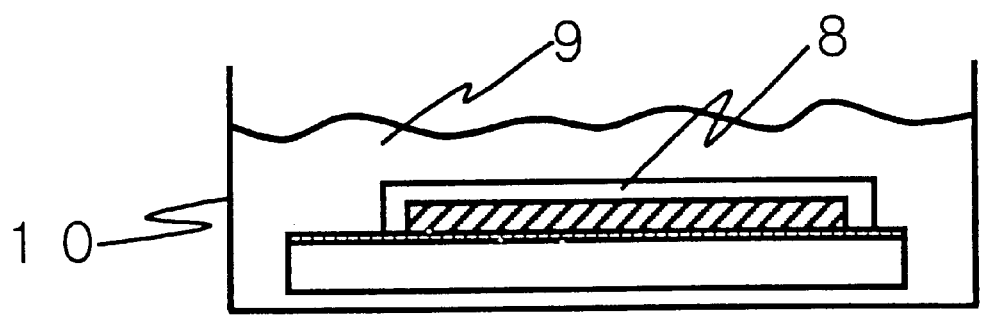
Figure 1:
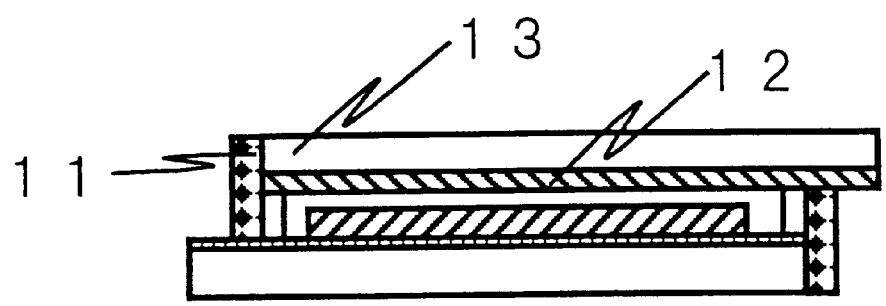

The polymer compound of the present invention has a crosslinked structure and thus has excellent retention of an electrolyte solution of a solar cell and favorable mechanical strength. The polymer compound is obtained by:

1) polymerizing units represented by the general formula (I):

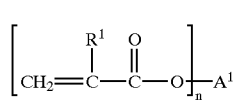

wherein $R^1$ is a hydrogen atom or a methyl group, $A^1$ is a hydrocarbon residue optionally containing an oxygen atom and bonded via a carbon atom and n is an integer of 2 to 4; or copolymerizing the unit represented by the general formula (I) and other methacrylate monomer and/or acrylate monomer than the units of general formula (I);

2) polymerizing units represented by the general formula (II):

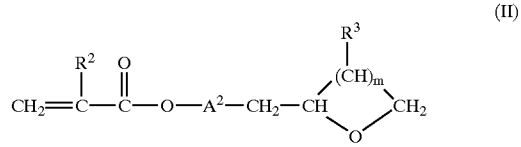

wherein $R^2$ and $R^3$, equal to or different from each other, are a hydrogen atom or a methyl group, $A^2$ is a bond or a bivalent group derived from a (poly)alkyleneoxy group and m is 0 or 2; or copolymerizing the unit represented by the general formula (II) and other methacrylate monomer and/or acrylate monomer than the units of general formula (II); or 3) polymerizing units containing two or more glycidyl groups.

$A^1$ in the general formula (I) is preferably a hydrocarbon residue comprising one or more ethyleneoxy groups and one or more propyleneoxy groups. Units represented by the formula (100) are particularly preferable.

The units represented by the general formula (I) may be

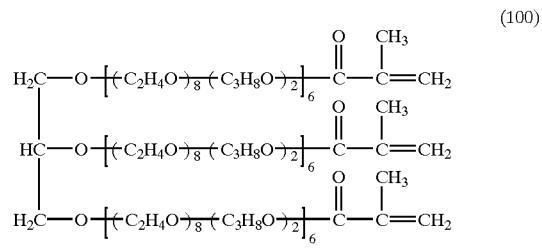

The units represented by the general formula (I) may be 1,4-buthanediol diacrylate, 2-propenone acid[2-[1,1-dimethyl-2-[(1-oxo-2-propenyl)oxy]ethyl]-5-ethyl-1,3-dioxane-5-yl]methylester, ethyleneglycol dimethacrylate, triethyleneglycol dimethacrylate, tetraethyleneglycol dimethacrylate, 1,3-butyleneglycol dimethacrylate and trimethylolpropane trimethacrylate.

Examples of the units of the general formula (II) wherein A2 is a bond include, for example, glycidyl methacrylate, tetrahydrofurfuryl acrylate, tetrahydrofurfuryl methacrylate and the like.

It is preferable to use units of the general formula (II) wherein $A^2$ is a bivalent group derived from a (poly)alkyleneoxy group. In particular, $A^2$ is preferably a bivalent group represented by the formula (III):

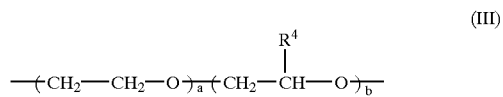

wherein a and b, equal to or different from each other, are an integer of 0 or a positive number, $R^4$ is a hydrogen atom or a methyl group derived from a (poly)ethyleneoxy group and a (poly)propylene group. Further, it is more preferable to use units of the general formula (II) wherein $R^2$ is a methyl group, $R^3$ is a hydrogen atom, $A^2$ is represented by the formula (III) wherein a is 8, b is 2, $R^4$ is a methyl group and m is 1.

The methacrylate monomer and the acrylate monomer (may be called together as "(meth)acrylate monomers") to be copolymerized with the unit of the general formula (I) or (II) may be any commercially available ones. Specifically, examples of the methacrylate monomer include methyl methacrylate, ethyl methacrylate, n-butyl methacrylate, isobutyl methacrylate, 2-ethylhexyl methacrylate, lauryl methacrylate, benzyl methacrylate, tridecyl methacrylate, stearyl methacrylate, cyclohexyl methacrylate, 2-hydroxyethyl methacrylate, glycidyl methacrylate and the like. Examples of the acrylate monomer include isobornyl acrylate, dimethylaminoethyl acrylate, isobutyl acrylate, cetyl acrylate (hexadecyl acrylate), 4-hydroxybutyl acrylate, t-butyl acrylate, 2-methoxyethyl acrylate, 3-methoxybutyl acrylate, lauryl acrylate and the like.

Among these, methyl methacrylate, ethyl methacrylate, lauryl methacrylate, stearyl methacrylate, isobutyl acrylate, cetyl acrylate, 3-methoxybutyl acrylate and lauryl acrylate are particularly preferable.

The ratio between the unit of the general formula (I) or (II) and the (meth)acrylate monomer varies depending on the kinds of unit and (meth)acrylate monomer used and the combination of them. It may suitably be selected depending on the required crosslinkage of the polymer compound and the performance required to the solar cell. In general, an amount of the (meth)acrylate monomer (Y) is about 50 to 98 mol % with respect to the unit of the general formula (I) or (II) (X), i.e., the molar ratio of X:Y is about 1:1 to 49.

The units containing two or more of glycidyl groups may be the units represented by the following formulae (1) to (19) wherein n is an integer of 0 or more.

(1)
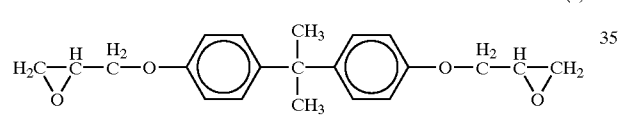

(2)
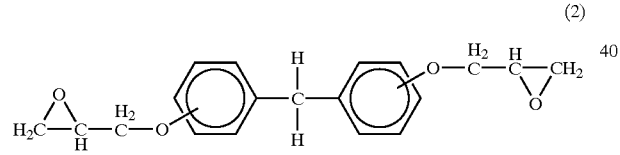

(3)
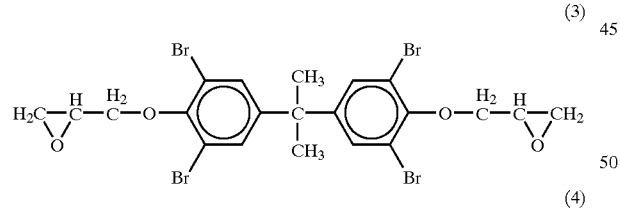

(4)
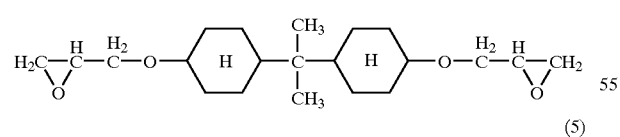

(5)
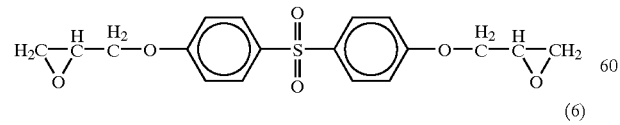

(6)
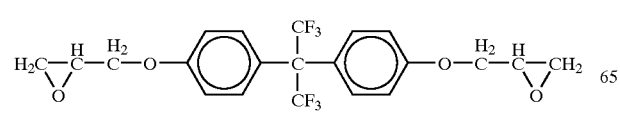

-continued (7)
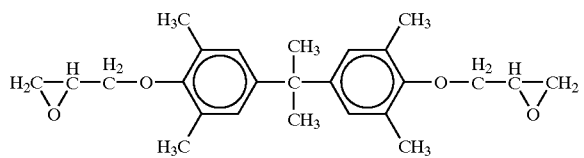

(8)
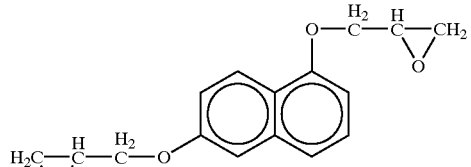

(9)
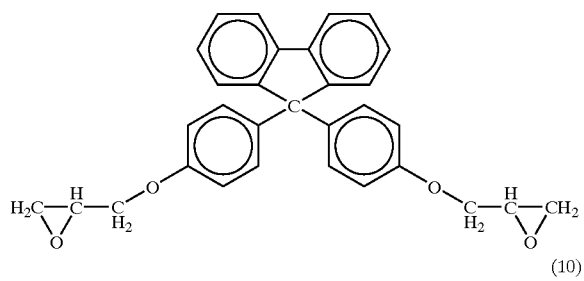

(10)
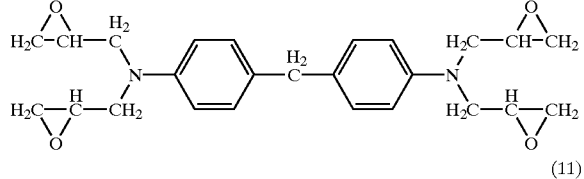

(11)
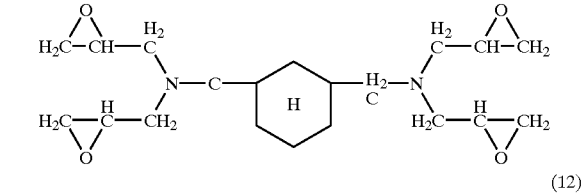

(12)
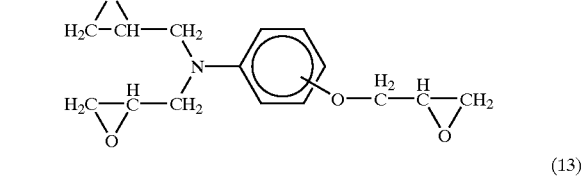

(13)
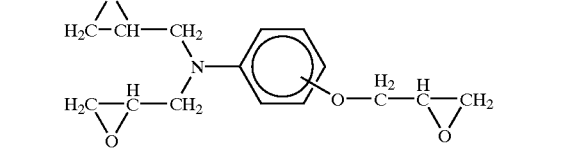

(14)
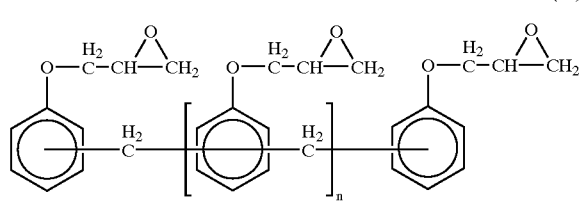

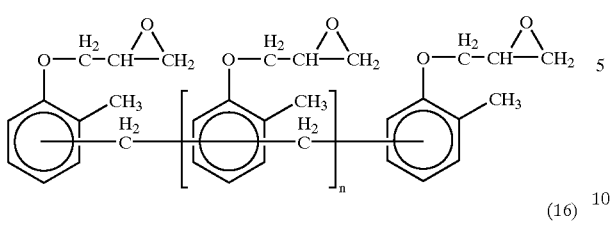

(15)

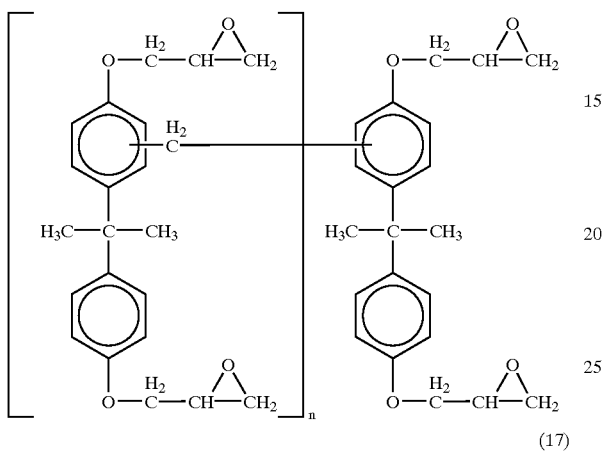

(16)

(17)

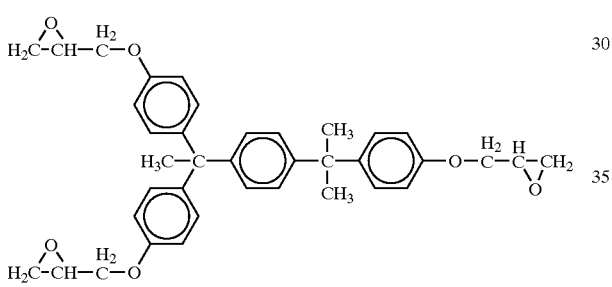

(18)

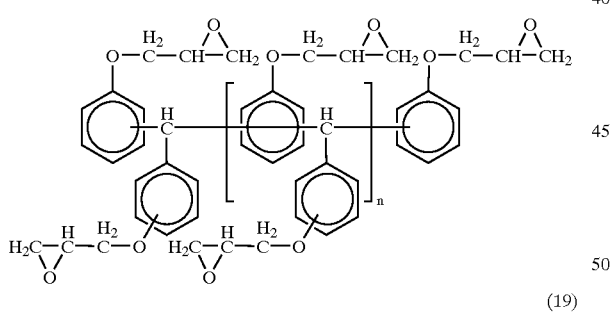

(19)

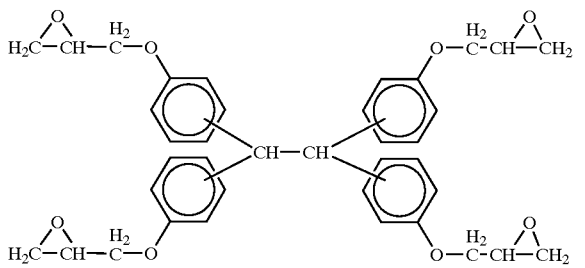

Further, the units containing three glycidyl groups arranged symmetrically with respect to a point as represented by the structural formulae (20) and (21) are preferable. Glycidyl isocyanulate of the structural formula (21) is particularly preferable. Since the units are constructed symmetrically with respect to a point, steric hindrance in a crosslinking reaction is reduced and reactivity is enhanced, so that a polymer compound having high quality three-dimensional structure can be prepared.

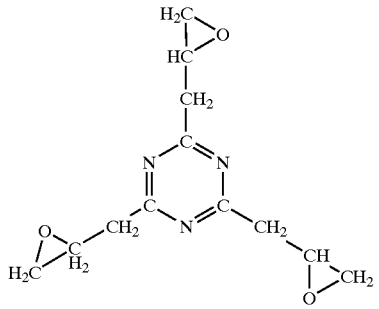

(20)

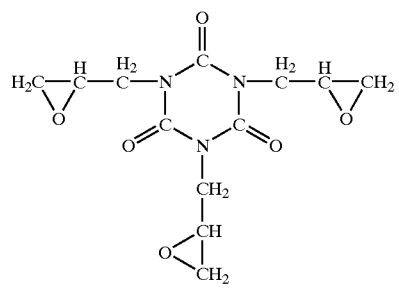

(21)

In the present invention, the above-mentioned units may be referred to as monomers.

The polymeric solid electrolyte is mainly comprised of a polymer compound and an electrolyte to be introduced therein.

The electrolyte is not particularly limited as long as it is in the form of an electrolyte solution generally used in batteries and solar cells. The electrolyte dissolved in the solution is preferably an oxidation-reduction electrolyte, but is not particularly limited as long as it is generally used in the batteries and the solar cells. A combination of metallic iodide such as LiI, NaI, KI or $CaI_2$ with iodine and a combination of metallic bromide such as LiBr, Nabr, KBr or $CaBr_2$ with bromine are preferable, among which the combination of metallic iodide and iodine is preferable.

The concentration of the electrolyte may be in the range of 0.1 to 1.5 mol/liter, among which 0.1 to 0.7 mol/liter is preferable. Examples of the solvent of the electrolyte include carbonate compounds such as propylene carbonate, nitrile compounds such as acetonitrile, alcohols such as ethanol, water and aprotic polar substances, among which the carbonate compounds and the nitrile compounds are preferable. Since the units used in the present invention preferably show affinity to the above-listed solvents, a polymer compound having excellent retention of the electrolyte is obtained by polymerizing the units.

In order to introduce the electrolyte in the polymer compound, the polymer compound is immersed in an electrolyte solution obtained by dissolving the electrolyte in a solvent such as polycarbonate so that the electrolyte solution is impregnated into the polymer compound. The impregnation takes about 2 hours. However, a time required for forming the solid polyelectrolyte is preferably reduced by raising a temperature for the impregnation since the electrolyte solution is activated and impregnated faster. The temperature for the impregnation may be set to about 35 to 36° C., for example, so that radial reaction does not occur.

Photovoltaic efficiency of the solar cell is deteriorated unless the solid polyelectrolyte is sufficiently introduced in the porous semiconductor. Therefore in general, a liquid monomer or a monomer dissolved in a solvent is impregnated in the porous semiconductor and then radical polymerization is performed. Examples of the solvent for dissolving the monomer include ethylene carbonate, propylene carbonate, ethyl acetate, chloroethane, dimethylformamide, N-methyl-2-pyrrolidone and the like.

Ethylene carbonate, propylene carbonate and N-methyl-2-pyrrolidone are preferable to dissolve units capable of forming a crosslinked polymer compound through polymerization.

The polymerization is performed by photopolymerization, thermal polymerization and the like. In the solar cell, titanium oxide is often used as the porous semiconductor. Titanium oxide causes photocatalysis under ultraviolet rays, so that when the photopolymerization is performed with the ultraviolet rays, photocatalysis occurs and a dye adsorbed in the porous semiconductor may be decomposed. Therefore, the thermal polymerization is preferably employed.

In general, the thermal polymerization is performed with use of a polymerization initiator under heating. Concentration of the polymerization initiator and heating temperature are suitably selected depending on the monomer to be used.

The rate of the polymerization in the radical polymerization is generally proportional to $0.5^{th}$ power of the concentration of the polymerization initiator, so that lower concentration of the polymerization initiator extremely lengthens polymerizing time. Therefore, the concentration of the polymerization initiator is preferably about 0.5 to 10 wt % with respect to the monomer.

For polymerizing the units containing two or more glycidyl groups, the polymerization may be performed in the presence of a curing agent. A polyaddition curing agent, a catalytic curing agent and the like are applicable. The polyaddition curing agent may be amine compounds, anhydrides or the like. Examples of the amine compounds function as the polyaddition curing agent include diethylenetriamine (DETA), triethylenetetramine (TETA), methaxylylenediamine (MXDA), isophoronediamine (IPD), diaminodiphenylmethane (DDM), dicyandiamide (DICY) and the like. Examples of the anhydrides used as the polyaddition curing agent include dodecenylsuccinic anhydride (DDSA), poly(azelaic anhydride) (PAPA), hexahydrophthalic acid (HHPA), methyltetrahydrophthalic acid (MTHPA) and the like.

Examples of the catalytic curing agent include benzyldimethylamine (BDMA), 2,4,6-trisdimethylaminomethylphenol (DMP-30), 2-methylimidazole (2MZ), 2-ethyl-4-methylimidazole (EMI24) and the like. Further, compounds listed in Practical Encyclopedia of Plastics (material edition) published by SANGYO CHOSAKAI may also be used.

In general, ring-opening polymerization by heat is performed with use of the curing agent as listed above under heating. The concentration of the curing agent and the heating temperature are suitably selected depending on the monomer used. Specifically, the concentration of the catalytic curing agent is 0.5 to 10 wt % and that of the polyaddition curing agent is about 0.5 to 50 wt %. The polyaddition curing agent is preferably added in a relatively large amount.

The catalytic curing agent is dissolved in a solution containing the monomer in a suitable concentration and then injected into the porous semiconductor layer. Since the polyaddition curing agent may possibly initiate curing immediately after it is added to the monomer, the polyaddition curing agent is impregnated in the porous semiconductor layer after the monomer solution is injected in the porous semiconductor layer. The injection is preferably performed at a low temperature, for example, at about 10° C.

A metal oxide semiconductor to constitute the porous semiconductor layer is not particularly limited as long as it is typically used as a photovoltaic material. Examples thereof include known semiconductors such as titanium oxide, zinc oxide, tungsten oxide, barium titanate, strontium titanate, cadmium sulfide and the like. Two or more of the metal oxide semiconductors may be mixed. Among them, titanium oxide and zinc oxide are preferable and titanium oxide is more preferable in view of photovoltaic efficiency, stability and safety. Such titanium oxide may be any kinds of titanium oxide including anatase titanium oxide, rutile titanium oxide, amorphous titanium oxide, methatitanium oxide and orthotitanium oxide, as well as titanium hydroxide and hydrous titanium oxide.

The porous semiconductor may be in any form of particles, film and the like, but it is preferably formed on a substrate as a porous semiconductor film.

The substrate on which the porous semiconductor film is formed may be a glass substrate, a plastic substrate and the like, among which a highly transparent substrate (a transparent substrate) is particularly preferable.

The porous semiconductor film may be formed on the substrate by various known methods. More specifically, it may be formed by:

1) applying a suspension containing the semiconductor particles onto the substrate and then drying and baking the suspension;

2) CVD or MOCVD utilizing a desired material gas; or

3) PVD, vapor deposition or sputtering with use of a solid material, or a sol-gel method.

The thickness of the porous semiconductor film is not particularly limited, but preferably about 0.1 to 50 $\mu$m, more preferably about 0.5 to 20 $\mu$m in view of transmissivity and photovoltaic efficiency. In order to improve the photovoltaic efficiency, the porous semiconductor film needs to adsorb a dye to be mentioned later in a larger amount. Therefore, the porous semiconductor film preferably has a large specific surface area of about 10 to 200 m$^2$/g, for example.

As the semiconductor particles, may be used are commercially available semiconductor particles of a single substance or a compound having an average particle diameter of about 1 to 2000 nm, preferably about 1 to 500 nm.

Examples of the solvent in which the semiconductor particles are suspended include glyme solvents such as ethyleneglycol monomethyl ether, alcohols such as isopropylalcohol, solvent mixtures such as of isopropyl alcohol/toluene, water and the like.

With respect to the step of drying and baking in the method 1) of forming the porous semiconductor film, conditions such as temperature, time and atmosphere are suitably adjusted depending on the kinds of substrate and semiconductor particles to be used. For example, it is performed under atmospheric air or inert gas atmosphere at about 50 to 800° C. for about 10 seconds to 12 hours. The step of drying and baking may be performed once at a certain temperature or twice or more while varying the temperature.

The transparent conductive film to be used as an electrode is not particularly limited, but for example, a transparent conductive film of ITO, SnO$_2$ or the like is preferably used. The manufacturing method of the electrode and the thickness thereof may suitably be selected.

In the porous semiconductor film, a dye which functions as a photosensitivity enhancing agent (hereinafter referred to as "a dye") is adsorbed. The adsorption may be performed by, for example, immersing the porous semiconductor film formed on the substrate in a solution in which the dye is dissolved.

An applicable dye has an absorption spectrum in the ranges of various visible rays and infrared rays. The dye preferably has in its molecule an interlock group such as a carboxyl group, an alkoxy group, a hydroxyl group, a hydroxyalkyl group, a sulfonic acid group, an ester group, a mercapto group, a phosphonyl group and the like so that the dye is surely adsorbed into the semiconductor layer.

The interlock group provides electrical connection that facilitates electron transfer between the excited dye and a conduction band of the semiconductor. Examples of the dye having the interlock group include ruthenium bipyridine dyes, azoic dyes, quinone dyes, quinoneimine dyes, quinacridone dyes, squarylium dyes, cyanine dyes, merocyanine dyes, triphenylmethane dyes, xanthene dyes, porphyrin dyes, phthalocyanine dyes, perylene dyes, indigo dyes, naphthalocyanine dyes and the like.

The solvent for dissolving the dye is not particularly limited as long as it dissolves the dye. For example, it may be alcohols such as ethanol, ketones such as acetone, ethers such as diethylether, tetrahydrofuran and the like, nitride compounds such as acetonitrile, halogenated aliphatic hydrocarbons such as chloroform, aliphatic hydrocarbons such as hexane, aromatic hydrocarbons such as benzene, toluene and the like, esters such as ethyl acetate, water and the like. Two or more of these solvents may be mixed.

The concentration of the dye in the solution may suitably be adjusted depending on the kinds of dye and solvent to be used, but it is preferably adjusted as high as possible to improve the adsorptivity. For example, the dye concentration is preferably $5 \times 10^{-5}$ mol/liter or more.

The conditions for immersing the semiconductor into the solution containing the dissolved dye, e.g., temperature of the solution, temperature of atmosphere and pressure, are not particularly limited. For example, the immersion may be performed at about room temperature under atmospheric pressure. Immersing time may suitably be adjusted depending on the kinds of dye and solvent to be used and the concentration of the solution. The immersion is effectively performed under heating at a temperature not higher than a boiling point of the solvent used, which is preferable since the dye is readily adsorbed in the porous semiconductor film.

Figure 2:
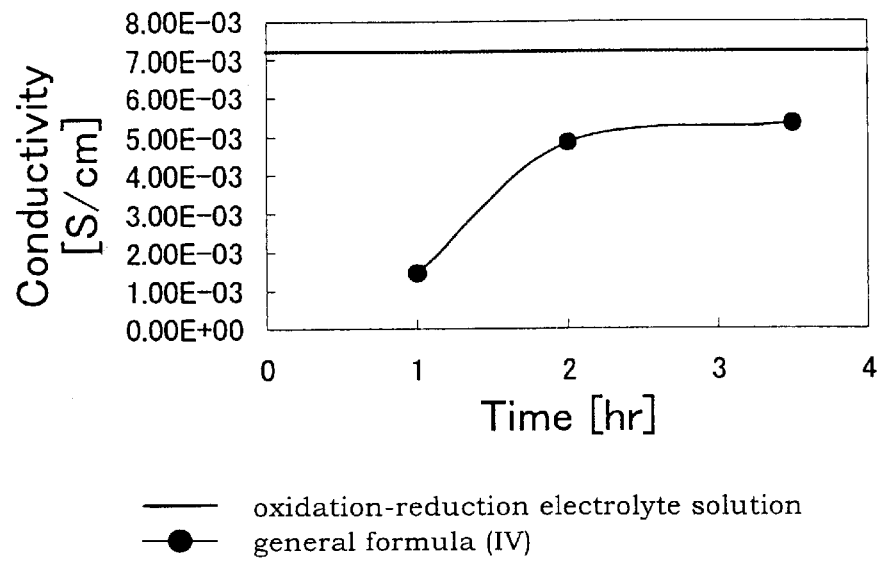
FIG. 2 is a graph illustrating a change in ion conductivity of the polyelectrolyte impregnated at room temperature.

To introduce the oxidation-reduction electrolyte solution in the above-mentioned polymer compound, the polymer compound is immersed in the oxidation-reduction electrolyte solution so that the solution is impregnated into the polymer compound. Ion conductivity of the thus obtained polyelectrolyte is evaluated (impregnation at 25° C.). The results are shown in FIG. 2. For the evaluation a polymer compound manufactured by using only a monomer of the general formula (IV) which has been utilized in the prior art is used. In the general formula (IV), $R^5$ and $R^6$ are methyl groups, $R^7$ is a hydrogen atom, x=0 and y=5.

FIG. 2 shows that at least 2 hours are required for the impregnation. Where the impregnating temperature is raised, the oxidation-reduction electrolyte solution is activated and impregnated faster, which reduces the manufacturing time of the polyelectrolyte. The impregnating temperature is adjusted so that radical reaction does not occur. Specifically, a temperature of about 35 to 65° C. is preferable.

Figure 3:
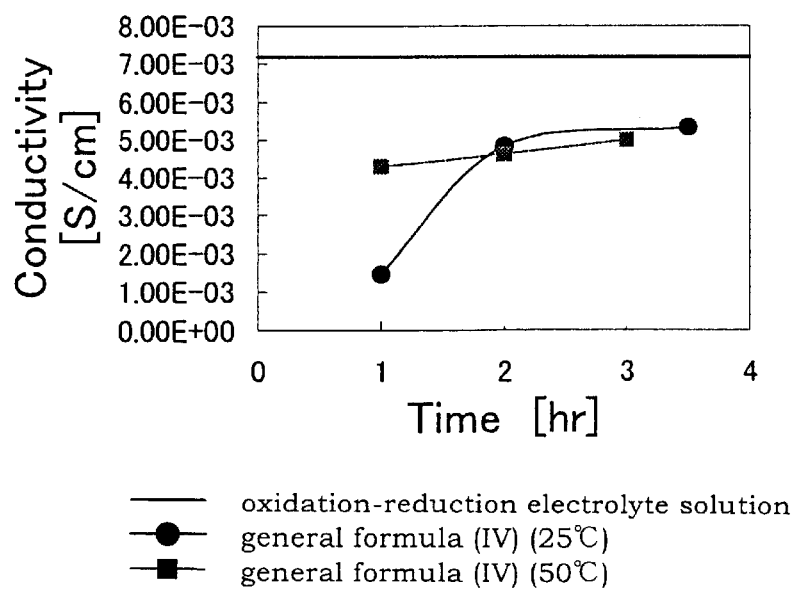
FIG. 3 is a graph illustrating a change in ion conductivity of the polyelectrolyte impregnated at room temperature and 50° C.

FIG. 3 shows a change in ion conductivity where the impregnating temperature is set to 50° C. and the monomer represented by the general formula (IV) wherein $R^5$ and $R^6$ are methyl groups, $R^7$ is a hydrogen atom, x=0 and y=5 is solely used. The results show that the impregnation rate increases by raising the impregnating temperature.

Figure 4:
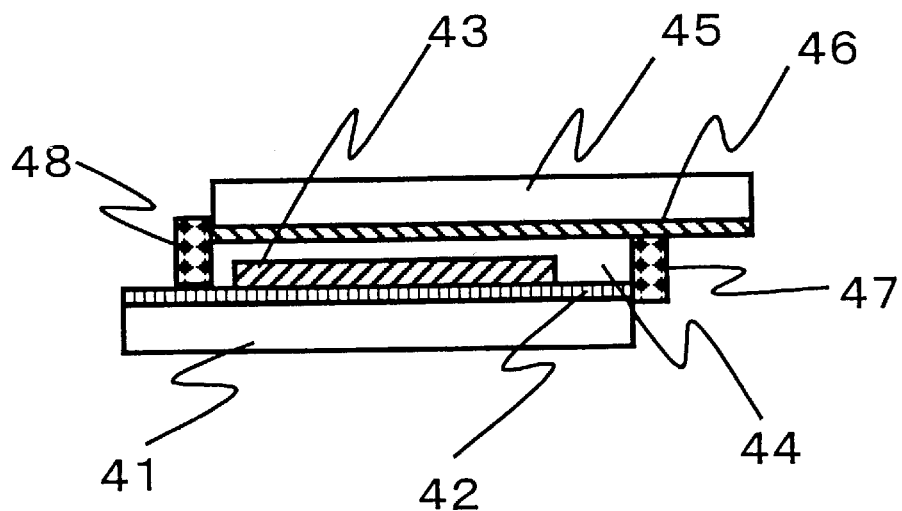
FIG. 4 is a schematic sectional view of a major part illustrating a layered structure of the dye-sensitized solar cell utilizing the polymer electrolyte.
Figure 5:
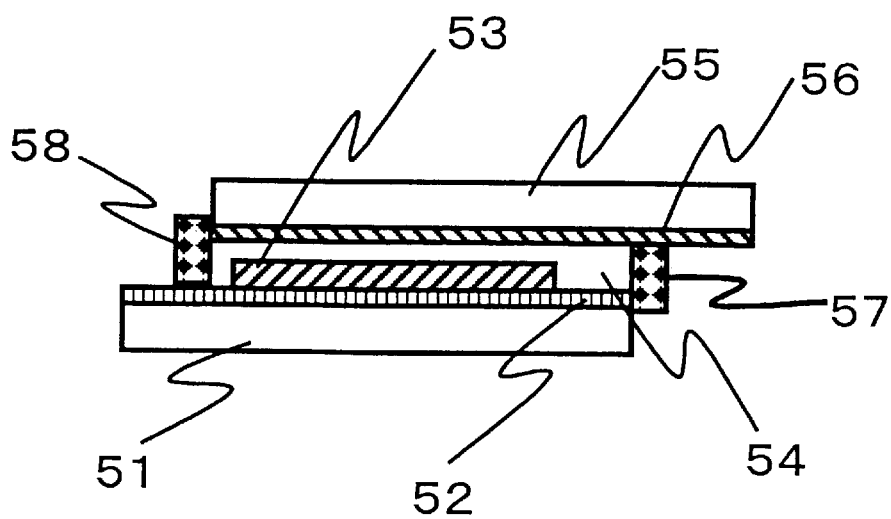
FIG. 5 is a schematic sectional view of a major part illustrating a layered structure of a dye-sensitized solar cell according to the prior art.

As shown in FIG. 4, the above-described dye-sensitized solar cell is provided by forming a semiconductor electrode 43 on a support 41 of a glass substrate or the like which is coated with a transparent conductive film 42 and adsorbing a dye in the semiconductor electrode 43. Thereafter, a monomer solution is impregnated therein and thermal polymerization is performed to obtain a polymer compound 44, and then an oxidation-reduction electrolyte solution is impregnated into the polymer compound 44. A counter electrode 45 is coated with a catalyst such as platinum 46 and coupled with the transparent support 41 so that the semiconductor electrode 43 and the platinum 46 are faced to each other. Then the circumference of the coupled structure is sealed with an epoxy resin 47, 48.

In conclusion, the method of manufacturing the dye-sensitized solar cell of the present invention comprises the steps of:

(a) forming a transparent conductive film on a surface of a transparent substrate;

(b) forming a porous semiconductor layer on a surface of the transparent conductive film;

(c) impregnating a dye solution in the porous semiconductor layer;

(d) impregnating a solution containing units capable of forming a crosslinked polymer compound through polymerization in the porous semiconductor layer to form a polymer compound on the surface and in the inside of the porous semiconductor layer;

(e) impregnating an electrolyte solution in the polymer compound to form an electrolyte; and (f) placing a conductive substrate and sealing a circumference portion thereof.

In the step (d) of above-mentioned method, the solution containing the units capable of forming the crosslinked polymer compound through polymerization is preferably impregnated in the porous semiconductor under vacuum.

Further, in the step (e), the electrolyte solution is preferably impregnated into the polymer compound under heating.

When the dye-sensitized solar cell utilizing the thus manufactured polyelectrolyte is irradiated with solar beam, the dye adsorbed in the photovoltaic semiconductor absorbs visible rays and electrons are excited therein. The electrons are transferred to the semiconductor and then to the counter electrode to reduce the oxidation-reduction electrolyte in the polyelectrolyte. The dye from which the electrons are transferred to the semiconductor presents an oxidized state but it is reduced to its original state by the oxidation-reduction electrolyte. In this manner, the electrons are flown, which constitutes the dye-sensitized solar cell utilizing the polyelectrolyte according to the present invention.

EXAMPLES

The present invention will be described in detail with reference to Examples, but the invention is not limited thereto.

Example 1

A method of manufacturing a dye-sensitized solar cell utilizing a polyelectrolyte is described with reference to FIGS. 1(a) to 1(e). In FIGS. 1(a) to 1(e), reference numeral 1 denotes a transparent substrate, 2 a transparent conductive film, 3 a titanium oxide film, 4 a separator, 5 a PET film, 6 a press plate, 7 a monomer, 8 a polymer compound, 9 an oxidation-reduction electrolyte solution, 10 a vessel, 11 a sealing agent, 12 a platinum film and 13 a conductive substrate. FIGS. 1(a) to 1(e) are sectional views sequentially illustrating the manufacturing steps of the dye-sensitized solar cell.

As a coating liquid for forming the titanium oxide film 3, a suspension of titanium oxide was prepared by dispersing commercially available titanium oxide particles (AMT-600 manufactured by Tayca corporation, anatase-type crystal, average particle diameter 30 nm, specific surface area 50 $m^2/g$) of 4.0 g and diethyleneglycol monomethyl ether of 20 ml in a paint shaker for 6 hours using glass beads. With a doctor blade, the titanium oxide suspension was applied to a transparent conductive film 2 of $SnO_2$ formed on a glass transparent substrate 1 to have a thickness of about 10 $\mu$m and an area of about 10 mm×10 mm. It was pre-dried at 100° C. for 30 minutes and then baked at 460° C. for 40 minutes. Thus, the titanium oxide film 3 of about 8 $\mu$m thick was formed.

A ruthenium dye (Ruthenium 535 manufactured by Solaronix) was dissolved in anhydrous ethanol in a concentration of $4\times10^{-4}$ mol/liter to prepare a dye solution. The dye solution was put in a vessel which is not shown, and the transparent substrate 1 on which the transparent conductive film 2 and the titanium oxide film 3 had been provided were immersed in the solution for about 4 hours so that the dye was adsorbed in the titanium oxide film 3. Thereafter, it was washed several times with anhydrous ethanol and dried at about 60° C. for about 20 minutes (FIGS. 1(a) to 1(b)).

Then, a monomer represented by the formula (100), which is one of the monomers of the general formula (I), was dissolved in propylene carbonate (hereinafter abbreviated to PC) in a concentration of 20 wt % and azobisisobutylonitrile (AIBN) was dissolved therein as a polymerization initiator in a concentration of 1 wt % with respect to the monomer to prepare a monomer solution. The monomer solution was impregnated in the titanium oxide film 3 by the following steps of: 1) placing the transparent substrate 1 provided with the transparent conductive film 2 and the titanium oxide film 3 in a vessel such as a beaker in a vacuum chamber and evacuating the chamber for about 10 minutes using a rotary pump; 2) pouring the monomer solution in the beaker while maintaining vacuum in the chamber and maintaining for about 15 minutes so that the monomer solution was sufficiently impregnated in the titanium oxide film 3; and 3) providing a polyethylene separator 4, a PET film 5 and a press plate 6 as shown in FIG. 1(c) and fixing them with a clip not shown. Thereafter, thermal polymerization was performed by heating at about 85° C. for 30 minutes to form a polymer compound 8.

Next, an oxidation-reduction electrolyte solution to be impregnated in the polymer compound 8 was prepared by dissolving lithium iodide in a concentration of 0.5 mol/liter and iodine in a concentration of 0.05 mol/liter into PC as a solvent. The polymer compound 8 formed on the titanium oxide film 3 was immersed in the solution for about 2 hours so that the oxidation-reduction electrolyte solution was impregnated in the polymer compound 8. Thus, a polymeric solid electrolyte was formed.

Then, a conductive substrate 13 provided with a platinum film 12 was placed thereon and the circumference thereof was sealed with an epoxy sealing agent 11.

As a result of ion conductivity measurement, the ion conductivity of the thus manufactured polyelectrolyte was $7.0\times10^{-3}$ S/cm (25° C.), which was nearly equal to the ion conductivity of $7.2\times10^{-3}$ S/cm (25° C.) of the oxidation-reduction electrolyte solution to be impregnated in the polymer compound 8.

This indicates that the use of the polyelectrolyte allows manufacturing a dye-sensitized solar cell having the photovoltaic efficiency equivalent to that of the electrolyte solution. An actually manufactured dye-sensitized solar cell utilizing the polyelectrolyte showed short-circuit current of 17.82 $mA/cm^2$, open-circuit voltage of 0.622 V, fill factor of 0.56, photovoltaic efficiency of 6.2% (measured under AM 1.5). The performance was almost equivalent to that of a solar cell manufactured with a liquid electrolyte.

Example 2

A dye-sensitized solar cell was manufactured using the polyelectrolyte in accordance with Example 1.

In this example, the impregnation of the oxidation-reduction electrolyte solution into the polymer compound 8 was performed at 50° C. for 1 hours. The resulting polyelectrolyte showed the ion conductivity of $7.1\times10^{-3}$ S/cm, the short-circuit current of 18.56 $mA/cm^2$, the open-circuit voltage of 0.61 V, the fill factor of 0.62 and the photovoltaic efficiency of 7.0% (measured under AM 1.5). The dye-sensitized solar cell was obtained in shorter impregnation time than in Example 1, showing almost equivalent performance to that manufactured with a liquid electrolyte.

In Examples 3 to 6 shown below, dye-sensitized solar cells were manufactured in the same manner as in Example 2 except that the polymer compounds 8 were formed with various monomers of the general formula (I), respectively. The results are shown in Table 1.

Example 3

1,4-buthanediol diacrylate was used as the monomer of the general formula (I).

Example 4

Ethyleneglycol dimethacrylate was used as the monomer of the general formula (I).

Example 5

Triethyleneglycol dimethacrylate was used as the monomer of the general formula (I).

Example 6

Trimethylolpropane trimethacrylate was used as the monomer of the general formula (I).

TABLE 1

| | Monomer | Photovoltaic efficiency (%) |
|---|---|---|
| Ex. 3 | 1,4-buthanediol diacrylate | 3.9 |
| Ex. 4 | Ethyleneglycol dimethacrylate | 4.1 |
| Ex. 5 | Triethyleneglycol dimethacrylate | 6.0 |
| Ex. 6 | Trimethylolpropane trimethacrylate | 8.1 |

The photovoltaic efficiency of the dye-sensitized solar cells was varied depending on the monomers used. Among the monomers, trimethylolpropane trimethacrylate having three vinyl groups showed greater photovoltaic efficiency. Further, it was found that the longer side chain the monomer has, the greater the photovoltaic efficiency becomes.

The polymer compound 8 is formed by copolymerizing the monomer of the general formula (I) and a (meth)acrylate monomer. In Examples 7 to 14 shown below, dye-sensitized solar cells were manufactured in the same manner as in Example 2 except that the polymer compounds 8 were formed by combining the monomers of the general formula (I) and the (meth)acrylate monomers, respectively. The results are shown in Table 2. The mixing ratio between the monomer of the general formula (I) and the (meth)acrylate monomer is also described in Table 2.

Example 7

1,4-buthanediol diacrylate and isobutyl acrylate were used as the monomer of the general formula (I) and the acrylate monomer, respectively.

Example 8

1,4-buthanediol diacrylate and 3-methoxybutyl acrylate were used as the monomer of the general formula (I) and the acrylate monomer, respectively.

Example 9

1,4-buthanediol diacrylate and cetyl acrylate were used as the monomer of the general formula (I) and the acrylate monomer, respectively.

Example 10

1,4-buthanediol diacrylate and lauryl acrylate were used as the monomer of the general formula (I) and the acrylate monomer, respectively.

Example 11

Ethyleneglycol dimethacrylate and methyl methacrylate were used as the monomer of the general formula (I) and the methacrylate monomer, respectively.

Example 12

Ethyleneglycol dimethacrylate and ethyl methacrylate were used as the monomer of the general formula (I) and the methacrylate monomer, respectively.

Example 13

Ethyleneglycol dimethacrylate and lauryl methacrylate were used as the monomer of the general formula (I) and the methacrylate monomer, respectively.

Example 14

Ethyleneglycol dimethacrylate and stearyl methacrylate were used as the monomer of the general formula (I) and the methacrylate monomer, respectively.

Example 15

A solar cell was manufactured with a solid polyelectrolyte according to the steps shown in FIGS. 1(a) to 1(e).

As a coating liquid for forming a titanium oxide film 3, a suspension of titanium oxide was prepared by dispersing commercially available titanium oxide particles (AMT-600 manufactured by Tayca corporation, anatase-type crystal, average particle diameter 30 nm, specific surface area 50 m$^2$/g) of 4.0 g and diethyleneglycol monomethyl ether of 20 ml in a paint shaker for 6 hours using glass beads.

On a glass substrate which serves as a transparent substrate 1, a SnO$_2$ film was formed as a transparent conductive film 2 (FIG. 1(a)). Using a doctor blade, the titanium oxide suspension was applied to the transparent conductive film 2 provided on the transparent substrate 1 to form a film having a thickness of about 10 μm and an area of about 10 mm×10 mm. The film was pre-dried at 100° C. for 30 minutes and then baked under oxygen atmosphere at 460° C. for 40 minutes. Thus, the titanium oxide film 3 of about 8 μm thick was obtained.

A ruthenium dye (Ruthenium 535 manufactured by Solaronix) was dissolved in anhydrous ethanol to prepare a dye solution containing the dye in a concentration of 4×10$^{-4}$ mol/liter. The transparent substrate 1 provided with the transparent conductive film 2 and the titanium oxide film 3 was immersed in the dye solution for about 4 hours so that the dye was adsorbed in the titanium oxide film 3. Then, the transparent substrate 1 was washed several times with anhydrous ethanol and dried at about 60° C. for about 20 minutes (FIG. 1(b)).

A monomer of the general formula (II) wherein R$^2$ is a methyl group, R$^3$ is a hydrogen atom and A$^2$ is a bivalent group derived from eight ethyleneoxy groups and two propyleneoxy groups (i.e., in the general formula (III) a is 8, b is 2, R$^4$ is a methyl group and m is 1) was dissolved in propylene carbonate (PC) in a concentration of 20 wt %, and then azobisisobutylonitrile (AIBN) was dissolved therein as a polymerization initiator in a concentration of 1 wt % with respect to the monomer to prepare a monomer solution.

The thus obtained monomer solution was impregnated in the titanium oxide film 3 in the following steps.

1) The transparent substrate 1 provided with the transparent conductive film 2 and the titanium oxide film 3 was put in a beaker placed in a vacuum chamber and the chamber was evacuated for about 10 minutes using a rotary pump.
2) The monomer solution was poured into the beaker while maintaining vacuum in the chamber and kept for about 15 minutes so that the monomer solution was sufficiently impregnated into the titanium oxide film 3.
3) A polyethylene separator 4, a PET (polyethylene terephthalate) film 5 and a press plate 6 were provided on the transparent substrate 1 and fixed together with a

TABLE 2

| | X: monomer of the general formula (I) | Y: (meth)acrylate monomer | X:Y (molar ratio) | Photovoltaic efficiency (%) |
|---|---|---|---|---|
| Ex. 7 | 1,4-buthanediol diacrylate | Isobutyl acrylate | 1:1 | 4.0 |
| Ex. 8 | 1,4-buthanediol diacrylate | 3-methoxybutyl acrylate | 1:1 | 4.8 |
| Ex. 9 | 1,4-buthanediol diacrylate | Cetyl acrylate | 1:1 | 5.4 |
| Ex. 10 | 1,4-buthanediol diacrylate | Lauryl acrylate | 1:1 | 6.4 |
| Ex. 11 | Ethyleneglycol dimethacrylate | Methyl methacrylate | 1:4 | 4.3 |
| Ex. 12 | Ethyleneglycol dimethacrylate | Ethyl methacrylate | 1:4 | 5.9 |
| Ex. 13 | Ethyleneglycol dimethacrylate | Lauryl methacrylate | 1:1 | 7.4 |
| Ex. 14 | Ethyleneglycol dimethacrylate | Stearyl methacrylate | 1:1 | 8.0 |

Table 2 shows that the longer side chain the (meth)acrylate monomer to be copolymerized with the monomer of the general formula (I) has, the greater the photovoltaic efficiency becomes.

clip. Thermal polymerization was then performed by heating the transparent substrate 1 at about 85° C. for 30 minutes. Thus, a polymer compound 8 which was insoluble to an organic solvent was obtained (FIG. 1(c)).

Then, an electrolyte solution 9 to be impregnated into the polymer compound 8 was prepared by dissolving lithium iodide in a concentration of 0.5 mol/liter and iodine in a concentration of 0.05 mol/liter in PC.

The transparent substrate 1 provided with the polymer compound 8 was immersed in the electrolyte solution 9 at 50° C. for 1 hour so that the electrolyte solution 9 was sufficiently impregnated into the polymer compound 8. Thus, a solid polyelectrolyte was formed (FIG. 1(d)).

The transparent substrate 1 and a conductive transparent 13 provided with a platinum film 12 were coupled so that the polymeric solid electrolyte formed on the titanium oxide film 3 and the platinum film 12 were faced to each other, and then the circumference of the coupled structure was sealed with an epoxy sealing agent 11 (FIG. 1(e)).

Thus, the solar cell utilizing the polymeric solid electrolyte according to the present invention was obtained.

Performance of the thus obtained solar cell was evaluated under AM 1.5. The solar cell showed short-circuit current of 17.6 mA/cm$^2$, open-circuit voltage of 0.6 V, fill factor of 0.68 and photovoltaic efficiency of 7.3%. The performance was equivalent to that of a solar cell obtained with an electrolyte solution without solidification.

From the above, the performance of the solar cell of the present invention is no less than that of the prior art solar cells. Further, in view of the monomer structure, the solar cell of the present invention is expected to show retention of the solution and mechanical strength greater than those of the prior art solar cells utilizing the solid polyelectrolyte.

Examples 16–18

Solar cells were manufactured in the same manner as in Example 15 except that the monomers of the general formula (II) were varied as shown in Table 3 and the photovoltaic efficiency was measured. The results are shown in Table 3.

TABLE 3

| | Monomer of the general formula (II) | Photovoltaic efficiency (%) |
| --- | --- | --- |
| Ex. 16 | Glycidyl methacrylate | 4.5 |
| Ex. 17 | Tetrahydrofurfuryl acrylate | 5.1 |
| Ex. 18 | Tetrahydrofurfuryl methacrylate | 5.5 |

Table 3 shows that the photovoltaic efficiency of the solar cell was varied by using different monomers. It also indicates that tetrahydrofurfuryl (meth)acrylate having a five-membered ring (m in the general formula (II) is 2) showed greater photovoltaic efficiency than glycil methacrylate having a three-membered ring (m in the general formula (II) is 0). It is considered that the size of the ring of the monomer influences the photovoltaic efficiency of the solar cell since the monomer opens its ring upon the polymerization.

Examples 19–26

Solar cells were manufactured in the same manner as in Example 15 except that copolymers of monomers of the general formula (II) and (meth)acrylate monomers as shown in Table 4 were used as the polymer compounds. The photovoltaic efficiency was measured and the results are shown in Table 4.

TABLE 4

| | X: monomer of the general formula (I1) | Y: (meth)acrylate monomer | X:Y (molar ratio) | Photovoltaic efficiency (%) |
| --- | --- | --- | --- | --- |
| Ex. 19 | Tetrahydrofurfuryl acrylate | Isobutyl acrylate | 1:1 | 5.1 |
| Ex. 20 | Tetrahydrofurfuryl acrylate | 3-methoxybutyl acrylate | 1:1 | 5.8 |
| Ex. 21 | Tetrahydrofurfuryl acrylate | Cetyl acrylate | 1:1 | 6.9 |
| Ex. 22 | Tetrahydrofurfuryl acrylate | Lauryl acrylate | 1:1 | 7.2 |
| Ex. 23 | Glycil methacrylate | Methyl methacrylate | 1:4 | 4.2 |
| Ex. 24 | Glycil methacrylate | Ethyl methacrylate | 1:4 | 6.0 |
| Ex. 25 | Glycil methacrylate | Lauryl methacrylate | 1:1 | 7.3 |
| Ex. 26 | Same as Example 1 | Stearyl methacrylate | 1:1 | 8.4 |

Table 4 shows that the longer side chain the (meth)acrylate monomer has, the greater the photovoltaic efficiency becomes. It seems to relate to the fact that the longer side chain the monomer has, the greater degree of swelling the solid polyelectrolyte shows.

Example 27

A method of manufacturing the dye-sensitized solar cell utilizing the polyelectrolyte is explained with reference to the sectional views of FIGS. 1(a) to 1(e).

A titanium oxide suspension for forming the titanium oxide film 3 was prepared by dispersing commercially available titanium oxide particles (AMT-600 manufactured by Tayca corporation, anatase-type crystal, average particle diameter 30 nm, specific surface area 50 m$^2$/g) of 4.0 g and diethyleneglycol monomethyl ether of 20 ml in a paint shaker for 6 hours using glass beads. With a doctor blade, the titanium oxide suspension was applied to a transparent conductive film 2 of SnO$_2$ formed on a transparent glass substrate 1 to have a thickness of about 10 μm and an area of about 10 mm×10 mm. It was pre-dried at 100° C. for 30 minutes and then baked under oxygen atmosphere at 460° C. for 40 minutes. Thus, the titanium oxide film 3 of about 8 μm thick was formed.

A ruthenium dye (Ruthenium 535 manufactured by Solaronix) was dissolved in anhydrous ethanol in a concentration of 4×10$^{-4}$ mol/liter to prepare a dye solution. The dye solution was put in a vessel and the transparent substrate 1 on which the titanium oxide film 3 and the transparent conductive film 2 had been provided were immersed in the solution for about 4 hours so that the dye is adsorbed in the titanium oxide film 3. Thereafter, it was washed several times with anhydrous ethanol and dried at about 60° C. for about 20 minutes (FIGS. 1(*a*) to 1(*b*)).

Using triglycidyl isocyanulate represented by the formula (21) as a monomer, the monomer was dissolved in N-methyl-2-pyrrolidone (NMP) in a concentration of 20 wt % and 2-methylimidazole was dissolved as a curing agent in a concentration of 5 wt % with respect to the monomer to prepare a monomer solution.

The monomer solution was impregnated in the titanium oxide film 3 by the following steps of: 1) placing the transparent substrate 1 provided with the transparent conductive film 2 and the titanium oxide film 3 in a vessel such as a beaker in a vacuum chamber and evacuating the chamber for about 10 minutes using a rotary pump; 2) pouring the monomer solution in the beaker while maintaining vacuum in the chamber and kept for 15 minutes so that the monomer solution was sufficiently impregnated in the titanium oxide film 3; and 3) providing a polyethylene separator 4, a PET film 5 and a press plate 6 as shown in FIG. 1(*c*) and fixing them with a clip. Thereafter, thermal polymerization was performed by heating at about 85° C. for 30 minutes to form a polymer compound layer 8. The thus obtained polymer compound layer 8 was in the solid form insoluble in NMP.

Then, an electrolyte solution to be impregnated in the polymer compound layer 8 was prepared by dissolving lithium iodide in a concentration of 0.5 mol/liter and iodine in a concentration of 0.05 mol/liter in NMP as a solvent. In the thus obtained electrolyte solution, the polymer compound layer 8 formed on the titanium oxide film 3 was immersed at 50° C. for 1 hour so that the oxidation-reduction electrolyte solution was impregnated into the polymer compound layer 8. Thus, a polymeric solid electrolyte layer (may be referred to as an electrolyte solution layer) was formed (FIG. 1(*d*)).

Then, a conductive substrate 13 provided with a platinum film 12 was placed thereon and the circumference was sealed with an epoxy sealing agent 11 (FIG. 1(*e*)). In this case, a polymer compound comprising a monomer having two or more glycidyl groups, which is used in the electrolyte layer of the present invention, may be used as the sealing agent.

The dye-sensitized solar cell utilizing the polyelectrolyte formed by the above-mentioned method showed the photovoltaic efficiency equivalent to that of a solar cell utilizing a liquid electrolyte. Specifically, the obtained dye-sensitized solar cell showed short-circuit current of 11.88 mA/cm$^2$, open-circuit voltage of 0.772 V, fill factor of 0.436, photovoltaic efficiency of 4.0% (measured under AM 1.5).

In the following examples, dye-sensitized solar cells were manufactured in the same manner as in Example 27 except that the monomers used for forming the polymer compound layer 8 were varied. The photovoltaic efficiency was measured and the results are shown in Table 5.

Example 28

A monomer represented by the formula (1) was used.

Example 29

A monomer represented by the formula (3) was used.

Example 30

A monomer represented by the formula (4) was used.

Example 31

A monomer represented by the formula (5) was used.

Example 32

A monomer represented by the formula (6) was used.

Example 33

A monomer represented by the formula (7) was used.

Example 34

A monomer represented by the formula (8) was used.

Example 35

A monomer represented by the formula (9) was used.

Example 36

A monomer represented by the formula (10) was used.

Example 37

A monomer represented by the formula (11) was used.

TABLE 5

|  | Photovoltaic efficiency (%) |
| --- | --- |
| Example 28 | 3.9 |
| Example 29 | 4.7 |
| Example 30 | 4.5 |
| Example 31 | 4.0 |
| Example 32 | 5.1 |
| Example 33 | 5.0 |
| Example 34 | 6.0 |
| Example 35 | 4.9 |
| Example 36 | 6.1 |
| Example 37 | 4.8 |

The photovoltaic efficiency of the dye-sensitized solar cell was varied depending on the kind of monomer used. The longer molecular chain the monomer had, the greater the photovoltaic efficiency became. The monomers represented by the formulae (1) to (11) have a glycidyl group at the terminal, respectively. Therefore, the longer the molecular chain is, the greater network and the greater retention with respect to the oxidation-reduction electrolyte solution the obtained polymer compound shows. This is considered to be a cause for the improvement of the photovoltaic efficiency.

According to the present invention, the oxidation-reduction electrolyte solution is stably retained in the crosslinked polymer compound in a large amount, so that a polyelectrolyte which exhibits the ion conductivity almost equivalent to that of an oxidation-reduction electrolyte solution having no polymer compound is produced.

Accordingly, the present invention provides a solar cell having excellent mechanical strength and performance equivalent to a solar cell utilizing an electrolyte solution.

Further, monomers of various combination are impregnated in the porous semiconductor layer and polymerized therein to form the polymer compound and then the oxidation-reduction electrolyte solution was injected in the polymer compound. Accordingly, the oxidation-reduction electrolyte solution is impregnated in a desired concentration, so that a more stable dye-sensitized solar cell is manufactured.

What is claimed is:

1. A dye-sensitized solar cell comprising a porous semiconductor layer in which a dye is adsorbed and an electrolyte which are sandwiched between a transparent conductive film formed on a surface of a transparent substrate and a conductive substrate, wherein the electrolyte is retained in a crosslinked polymer compound obtained by polymerizing a monomer represented by the general formal (I):

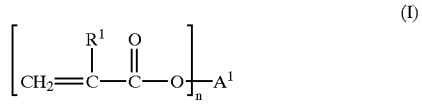

wherein $R^1$ is a hydrogen atom or a methyl group, $A^1$ is a hydrocarbon residue comprised of one or more ethyleneoxy groups and one or more propyleneoxy groups and n is an integer of 2 to 4.

2. A dye-sensitized solar cell according to claim 1, wherein the general formula (I) is represented by the formula (100):

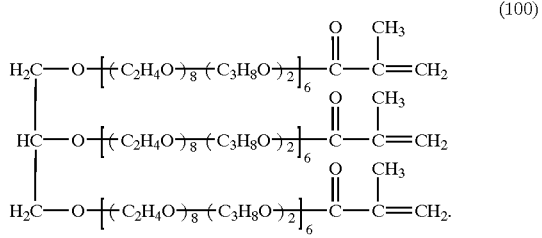

3. A dye-sensitized solar cell according to claim 1, wherein the polymer compound is a copolymer of the unit of the general formula (I) and other methacrylate monomer and/or acrylate monomer than the units of the general formula (I).

4. A dye-sensitized solar cell according to claim 3, wherein the methacrylate monomer is methyl methacrylate, ethyl methacrylate, lauryl methacrylate or stearyl methacrylate and the acrylate monomer is isobutyl acrylate, cetyl acrylate, 3-methoxybutyl acrylate or lauryl acrylate.

5. A dye-sensitized solar cell comprising a porous semiconductor layer in which a dye is adsorbed and an electrolyte which are sandwiched between a transparent conductive film formed on a surface of a transparent substrate and a conductive substrate, wherein the electrolyte is retained in a crosslinked polymer compound obtained by polymerizing a monomer represented by the general formula (II):

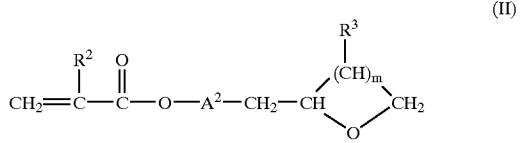

wherein $R^2$ and $R^3$, equal to or different from each other, are a hydrogen atom or a methyl group, $A^2$ is a bond or a bivalent group derived from a (poly)alkyleneoxy group and m is 0 to 2.

6. A dye-sensitized solar cell according to claim 5, wherein $A^2$ in the general formula (II) is a bivalent group represented by the formula (III):

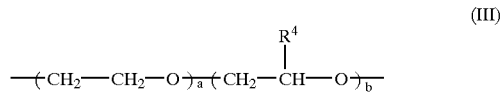

wherein a and b, equal to or different from each other, are an integer of 0 or a positive number and $R^4$ is a hydrogen atom or a methyl group.

7. A dye-sensitized solar cell according to claim 6, wherein, in the general formula (II), $R^2$ is a methyl group, $R^3$ is a hydrogen atom, m is 1 and $A^2$ is represented by the formula (III) in which a is 8, b is 2, and $R^4$ is a methyl group.

8. A dye-sensitized solar cell according to claim 5, wherein the units represented by the general formula (II) are of at least one kind selected from glycidyl methacrylate, tetrahydrofurfuryl acrylate and tetrahydrofurfuryl methacrylate.

9. A dye-sensitized solar cell according to claim 5, wherein the polymer compound is a copolymer of the unit of the general formula (II) and other methacrylate monomer and/or acrylate monomer than the units of the general formula (II).

10. A dye-sensitized solar cell according to claim 9, wherein the methacrylate monomer is methyl methacrylate, ethyl methacrylate, lauryl methacrylate or stearyl methacrylate and the acrylate monomer is isobutyl acrylate, cetyl acrylate, 3-methoxybutyl acrylate or lauryl acrylate.

11. A dye-sensitized solar cell according to claim 5, wherein the porous semiconductor layer is comprised of titanium dioxide or zinc oxide.

12. A dye-sensitized solar cell according to claim 5, wherein the electrolyte is an oxidation-reduction electrolyte comprising iodine or iodide.

13. A dye-sensitized solar cell comprising a porous semiconductor layer in which a dye is adsorbed and an electrolyte which are sandwiched between a transparent conductive film formed on a surface of a transparent substrate and a conductive substrate, wherein the electrolyte is retained in a crosslinked polymer compound obtained by polymerizing a monomer containing two or more glycidyl groups.

14. A dye-sensitized solar cell according to claim 13, wherein the polymer compound is obtained by polymerizing units having three glycidyl groups arranged symmetrically with respect to a point.

15. A dye-sensitized solar cell according to claim 14, wherein the units having three glycidyl groups arranged symmetrically with respect to a point are triglycidyl isocyanulate.

16. A dye-sensitized solar cell according to claim 13, wherein the porous semiconductor layer is comprised of titanium dioxide or zinc oxide.

17. A dye-sensitized solar cell according to claim 13, wherein the electrolyte is an oxidation -reduction electrolyte comprising iodine or iodide.

18. A method of manufacturing a dye-sensitized solar cell comprising the steps of:
   (a) forming a transparent conductive film on a surface of a transparent substrate;
   (b) forming a porous semiconductor layer on a surface of the transparent conductive film;
   (c) impregnating a dye solution in the porous semiconductor layer;
   (d) impregnating a solution containing units capable of forming a crosslinked polymer compound through polymerization in the porous semiconductor layer, and polymerizing to form crosslinked polymer compound on the surface and in the inside of the porous semiconductor layer;

(e) impregnating an electrolyte solution in the crosslinked polymer compound to form a polymeric solid electrolyte; and (f) placing a conductive substrate on the polymeric solid electrolyte and sealing a circumference portion of the solar cell wherein the crosslinked polymer compound is obtained by polymerizing a monomer represented by the general formula (I):

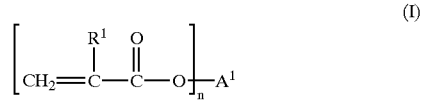

wherein $R^1$ is a hydrogen atom or a methyl group, $A^1$ is a hydrocarbon residue optionally containing an oxygen atom and bonded via a carbon atom and n is an integer of 2 to 4, or the crosslinked polymer compound is obtained by polymerizing a monomer containing two or more glycidyl groups, or the crosslinked polymer compound is obtained by polymerizing a monomer represented by the general formula (II)

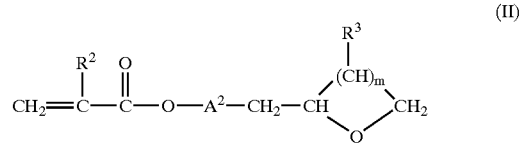

wherein $R^2$ and $R^3$, equal to or different from each other, are a hydrogen atom or a methyl group, $A^2$ is a bond or a bivalent group derived from a (poly)alkyleneoxy group and m is 0 to 2.

19. A manufacturing method according to claim 18, wherein the step (d) is comprised of impregnating the solution containing the units capable of forming the crosslinked polymer compound through polymerization in the porous semiconductor layer under vacuum.

20. A manufacturing method according to claim 18, wherein a solvent used in the solution containing the units capable of forming the crosslinked polymer compound through polymerization is ethylene carbonate, propylene carbonate or N-methyl-2-pyrrolidone.

21. A manufacturing method according to claim 18, wherein the step (e) is comprised of impregnating the electrolyte solution in the polymer compound under heating.

* * * * *